US006829296B1

(12) United States Patent
Troulis et al.

(10) Patent No.: US 6,829,296 B1
(45) Date of Patent: Dec. 7, 2004

(54) SPECTRALLY FLAT TIME DOMAIN EQUALIZER AND METHODS

(75) Inventors: Markos G. Troulis, Irvine, CA (US);
Evangelos Petsalis, Irvine, CA (US);
Xuming Zhang, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 646 days.

(21) Appl. No.: 09/665,784

(22) Filed: Sep. 20, 2000

(51) Int. Cl.$^7$ .............................. H03H 7/30; H03H 7/40; H03K 5/159

(52) U.S. Cl. ....................... 375/232; 375/231; 375/233; 375/229

(58) Field of Search ................................ 375/231, 232, 375/233, 229

(56) References Cited

U.S. PATENT DOCUMENTS

| | | | |
|---|---|---|---|
| 5,285,474 A | | 2/1994 | Chow et al. |
| 5,461,640 A | * | 10/1995 | Gatherer ...................... 375/231 |
| 5,870,432 A | * | 2/1999 | Kerckhove ................... 375/232 |
| 6,404,806 B1 | * | 6/2002 | Ginesi et al. ................ 375/222 |
| 6,526,105 B1 | * | 2/2003 | Harikumar et al. ......... 375/350 |
| 6,674,795 B1 | * | 1/2004 | Liu et al. ..................... 375/231 |
| 2003/0103576 A1 | * | 6/2003 | Kim et al. ................... 375/283 |

OTHER PUBLICATIONS

"Time–Domain Channel Equalizer Design Using the Inverse Power Method", by Wei–min Chiu, Wei Kang Tsai, Thomas C. Liau, University of California, Irvine and Markos Troulis, Conexant Systems, Inc.

"Time–Domain Equalizer Training for ADSL", by Mohammed Nafie and Alan Gatherer, Texas Instruments, Dallas, USA, IEEE, 1997.

Chow et al., "Equalizer Training Algorithms for Multicarrier Modulation Systems," IEEE, (Feb. 1993), pp. 761–765.

Al–Dhahir et al., "Optimum Finite–Length Equalization for Multicarrier Transceivers,"IEEE Transactions on Communications, vol. 44, No. 1(Jan. 1996), pp. 56–64.

Melsa et al., "Impulse Response Shortening for Discrete Multitone Transceivers," IEEE Transactions on Communications, vol. 44, No. 12(Dec. 1996), pp. 1662–1672.

* cited by examiner

*Primary Examiner*—Stephen Chin
*Assistant Examiner*—Harry Vartanian (57) ABSTRACT

The time domain equalizer filter of the present invention increases the data rate of a communications system while shortening a channel. Such a time domain equalizer filter is spectrally flat and the central tap is constrained to a non-zero real number. The error between the data filtered by the time domain equalizer filter and the data filtered by a target filter is reduced by adapting the time domain equalizer filter and the target filter. Adaptation of the time domain equalizer filter and the target filter may be accomplished by calculating new tap values for each filter while constraining the central tap of the time domain equalizer filter. In this way, the error between the data filtered by the time domain equalizer filter and the data filtered by the target filter may be reduced, so that a shortened channel may be provided. Accordingly, by shortening the channel and balancing the use of a spectrally flat time domain equalizer filter, the data rate of the communications system may be increased.

18 Claims, 4 Drawing Sheets

SPECTRALLY FLAT TIME DOMAIN EQUALIZER AND METHODS

BACKGROUND OF THE INVENTION

1. Technical Field

This invention generally relates to filters, and more specifically to a spectrally flat time-domain equalizer (TEQ) filter, which increases the data rate of a communications system.

2. Background Art and Technical Problems

In modern electronic circuits, many different kinds of filters are used in a variety of applications. Filters are typically used to remove one or more components of a signal so that a "clean" signal is obtained. For example, filters are used in a number of digital communication applications, such as equalization, echo cancellation, band selection, and the like. For example, a Digital Subscriber Line (DSL) system, such as an Asymmetric Digital Subscriber Line (ADSL) system, uses filters to process and provide specific attributes to the signals, which are transmitted over communications channels. More specifically, a Discrete Multi-tone (DMT) modulation transmission method can be used in ADSL. The DMT transmission divides the channel into several independent sub-channels making it easy to transmit data on each sub-channel. It is known in the art that a channel refers both to the physical channel and the mathematical representation of the channel (e.g., the channel impulse response). The overall data rate of the channel is the sum of the data rates over all these sub-channels. In this way, instead of transmitting data over one wideband channel, data is transmitted over the narrower sub-channels.

The transmission of successive DMT symbols (or packet of data) may allow inter-symbol interference (ISI) to appear due to the dispersive nature of the channel. One way to reduce or ideally eliminate ISI is to equalize the overall channel, for example, by appending a filter at the receiver end and making the overall channel impulse response at the receiver end very close or equal to a Dirac impulse. However, such a method is not efficient for the type of channels encountered in ADSL applications. For example, ADSL channels are dispersive; yielding a long impulse response, which implies an ISI corrupted signal together with a complex equalization structure. As ISI becomes more severe, the equalizer complexity rises rapidly and the computational cost increases to an unacceptable level. This implies that to keep a reasonable performance, a more complex, expensive, and powerful receiver must be adopted.

Another way to reduce or eliminate ISI is to insert between any two adjacent information symbols (such as DMT symbols) a time interval during which some non-information carrying data is transmitted. For example, a predefined data sequence may be transmitted. In any case, if this time interval (also known as guard period) is at least as long as the channel memory, the effects of ISI can be substantially isolated from one information symbol to the next information symbol, and processing may be performed in an information symbol by information symbol basis. If the transmitted information symbol is repeated, then the guard period is commonly referred to as the cyclic prefix because the repetition is essentially a cyclic extension of the information symbol. However, the channels used in ADSL applications, for example, have a long impulse response, which makes the guard period a waste of the available bandwidth.

A more practical solution combines the above two methods by both equalizing the channel and appending each information symbol with a guard period. This equalization method attempts to reduce the channel at the receiver end (i.e., the effective channel) to CP+1 taps, where CP is the cyclic prefix and taps are the coefficients of a filter. Accordingly, the channel may be coupled with a filter (e.g., a TEQ filter) to effectively shorten the channel to CP+1 significant taps, where significant taps are coefficient values that exhibit a significant or much higher value as compared to the value of the remaining coefficient values. By applying this method, ISI may theoretically be eliminated while maintaining a small overhead per transmitted information symbol (equal to the value of the CP).

Another concern in communications systems is noise. For instance, noise may be added to the analog signal while travelling over the channel (e.g., white Gaussian noise) by the process of digitizing the analog signal (e.g., quantization noise), and by the digital processing applied to the digitized signal. Those of skill in the art recognize that different kinds of noise will affect the signal quality in different ways. Furthermore, residual ISI usually has a flat spectrum and may contaminate the performance of the TEQ filter, which may decrease the ratio of the signal to noise power (SNR). A decrease in the SNR also reduces the data rate of the system, which is highly undesirable. As such, designing a TEQ filter that merely shortens the effective channel to CP+1 significant taps may also degrade the data rate, if the frequency response of the TEQ filter results in a significant attenuation of signal frequencies not originally attenuated. If the TEQ filter has a relatively flat frequency response (e.g., few ripples), then most useful or "good" frequencies will not be further attenuated. Information or data lost before the TEQ filter processing will remain lost, but substantially no additional losses will occur due to the TEQ filter processing.

Figure 1:
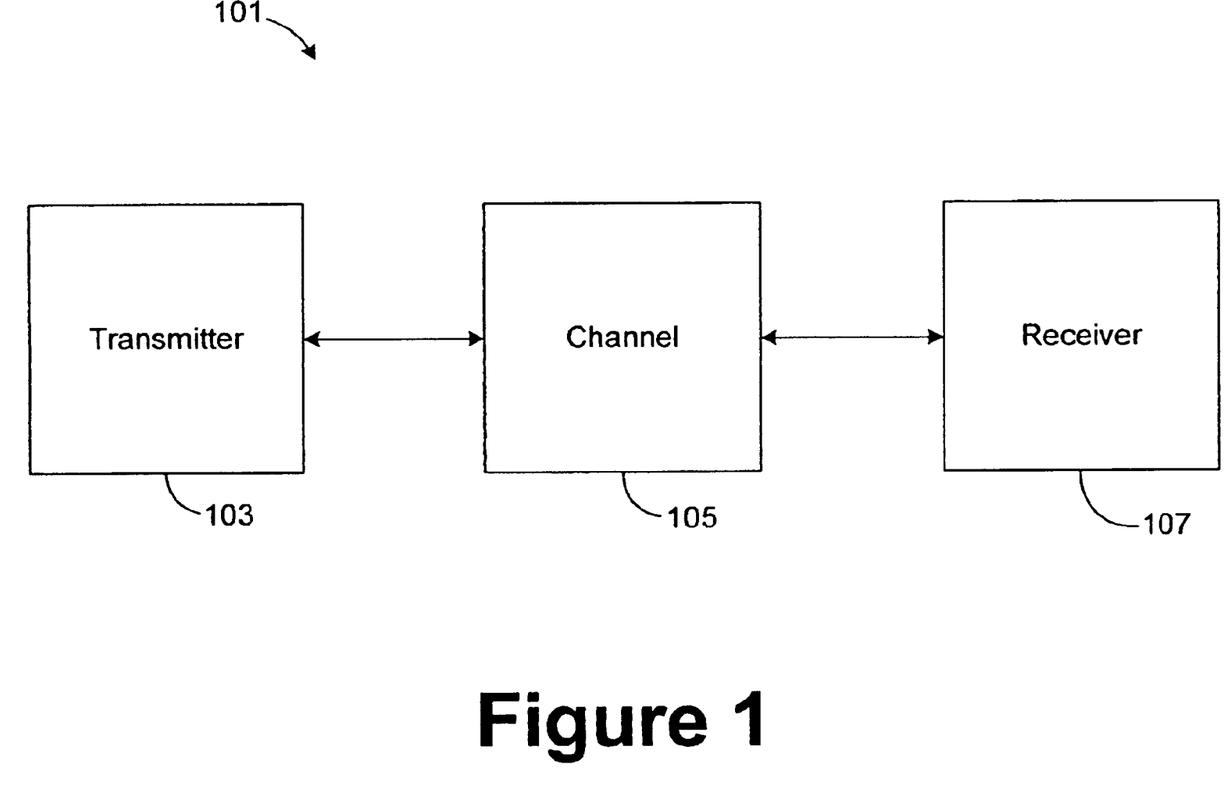
FIG. 1 is a block diagram of a communications system.

Communications systems are often characterized by a transmitter side and a receiver side that communicate via a channel. FIG. 1 illustrates a communications system 101 having a transmitter 103, a channel 105, and a receiver 107. Transmitter 103 transmits data in the form of one or more information symbols (e.g., DMT symbols) across channel 105 to receiver 107. Such information symbols have a cyclic prefix appended at or attached to the beginning of each information symbol transmitted. As such, each information symbol is preceded by its cyclic prefix and transmitted over channel 105. If channel 105 is longer than the cyclic prefix, then ISI may result at receiver 107 of communications system 101. In order to avoid such ISI, channel 105 may communicate with a time domain equalizer (TEQ) filter (not shown) to shorten the channel to a desired length.

Figure 2:
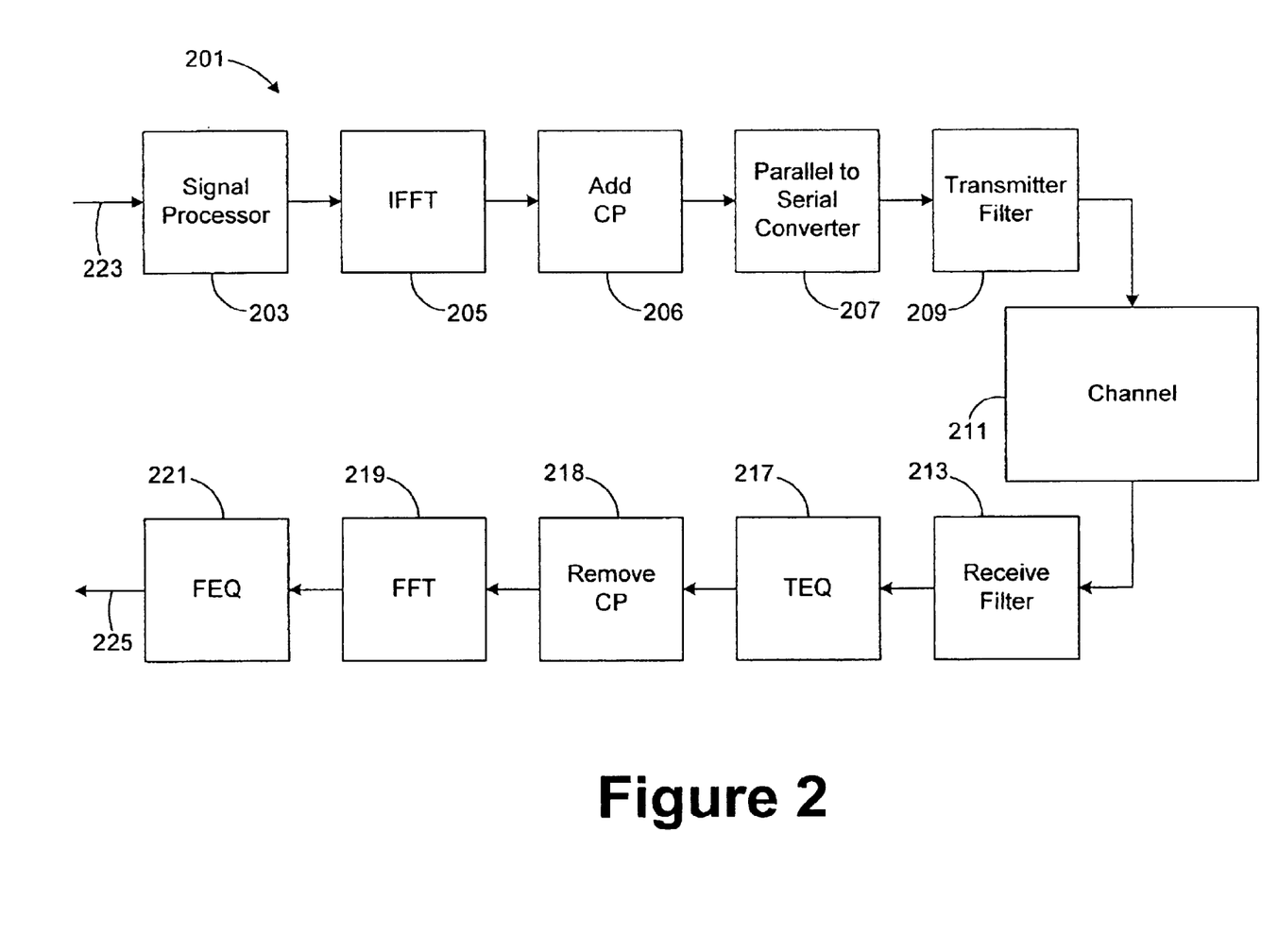
FIG. 2 is a representative block diagram of the communications system of FIG. 1.

FIG. 2 illustrates an exemplary communications system 201 having a TEQ filter 217. Communications system 201 includes a transmitter side and a receiver side, where a channel 211 provides a medium of communication between the two. On the transmitter side, communications system 201 includes a signal processor 203, an inverse fast Fourier transform (IFFT) engine 205, a parallel to serial converter 207, and a transmitter filter 209. Channel 211 may be any medium commonly used in communications systems. For example, in ADSL transmission, channel 211 may be a twisted pair of wires. On the receiver side, communications system 201 includes a receiver filter 213, a fast Fourier transform (FFT) engine 219, and a frequency domain equalizer (FEQ) 221.

Communications system 201 receives data 223 and outputs filtered data 225. Signal processor 203 processes data 223 and communicates the results to IFFT engine 205, and IFFT engine 205 produces time-domain data. A cyclic prefix (CP) is appended to each time-domain information symbol by an add CP means 206, and the modified information symbol communicated to parallel to serial converter 207. Parallel to serial converter 207 then converts the modified information symbol into a serial signal. The serial signal is communicated to transmitter filter 209 (e.g., a digital to analog conversion means), which transforms the serial signal into a continuous time signal.

Channel 211 provides a medium for transmitting the continuous time signal to receiver filter 213, which may perform some analog and digital filtering to the incoming signal. Receiver filter 213 digitizes the continuous time signal into a digital signal. TEQ filter 217 filters the digital signal in order to reduce and ideally cancel the ISI. The cyclic prefix is removed from each information symbol of the digital signal by a remove CP means 218 resulting in a modified digital signal. The modified digital signal is communicated to FFT engine 219 to process the modified digital signal before FEQ filter 221 inverts the effect of the channel in each transmitted information symbol and outputs data 225.

In an ideal environment, data 225 is the same as data 223. In addition, it is desirable to transmit the data at a high data rate. However, solely focusing on shortening a channel may sacrifice the desired increase in data rate because TEQ filter 217 may introduce spectral nulls to the digital signal. Since a TEQ filter could introduce spectral nulls, the data rate of the communications system may decrease. One way to achieve an increase in the data rate while shortening the channel is to design a TEQ filter that may adapt to different channels in order to shorten the channel as desired. Therefore, it is desirable to both shorten the channel and also control the spectral characteristics of the TEQ filter. Thus, a TEQ design and method for its use is needed which shortens the channel of a communications system without sacrificing the data rate.

SUMMARY OF THE INVENTION

In accordance with one embodiment of the present invention, a spectrally flat TEQ filter design reduces the error between the outputs of a TEQ filter and a target filter in order to increase the data rate of a communications system. Such an embodiment of the present invention shortens the channel while taking into account the shape of the TEQ filter frequency response. Since spectral flatness is at odds with shortening of the channel, it is desirable to have a balance between the two in order to lessen the effects of ISI noise on a signal while maintaining an adequate data rate. In accordance with one embodiment of the present invention, the TEQ filter design reduces the error between the output of the TEQ filter and the target filter by constraining the central tap of the TEQ filter to a non-zero real number while calculating the remaining tap values for the TEQ filter and the target filter. For example, reduction of the error between the TEQ filter and the target filter may be accomplished by using an adaptive filter identification algorithm. Thus, a spectrally flat TEQ filter is provided, which reduces the error between the TEQ filter and the target filter in order to increase the data rate of the communications system.

BRIEF DESCRIPTION OF THE DRAWING FIGURES

The subject invention will hereinafter be described in the context of the appended drawing figures, wherein like numerals denote like elements, and.

DETAILED DESCRIPTION

Figure 3:
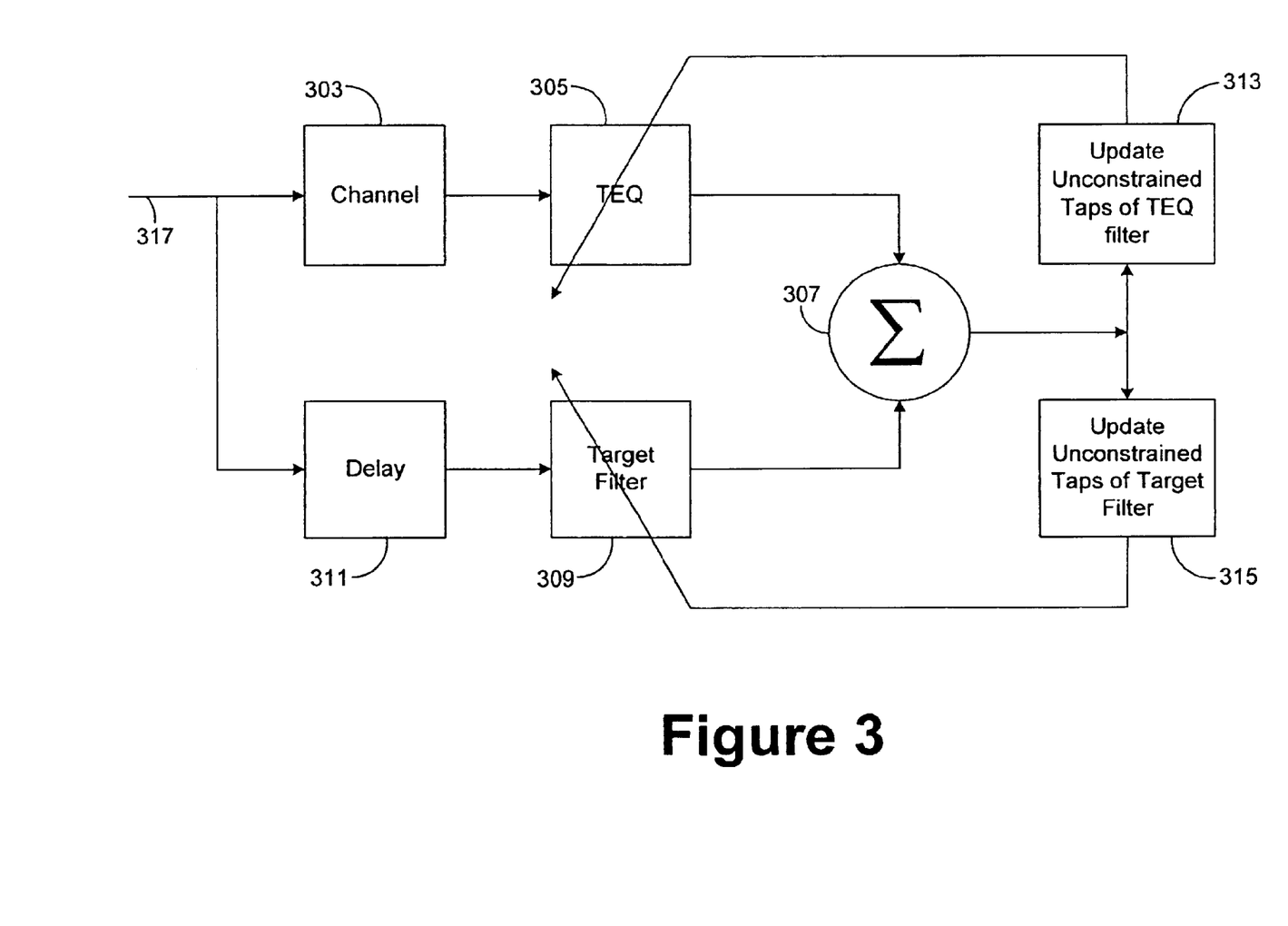
FIG. 3 is a block diagram illustrating one embodiment of the present invention.

FIG. 3 illustrates a communications system 301 of one embodiment of the present invention. In accordance with this embodiment of the present invention, communications system 301 uses a TEQ filter 305 (e.g., finite impulse response (FIR) filter) to shorten a continuous time channel impulse response associated with a channel 303. Communications system 301 further includes a target filter 309, an error estimator 307, an update TEQ processor 313, an update target processor 315, and a delay element 311. In accordance with this embodiment of the present invention, TEQ filter 305 has an impulse response which is spectrally flat in that the impulse response avoids significant ripple in the useful band.

Data 317 (for example, one or more information symbols) is communicated to channel 303 and the resulting signal is processed by TEQ filter 305. As discussed above, channel 303 may be any medium commonly used in communications systems. For example, in ADSL transmission, channel 303 may be a twisted pair of wires, such as copper wires, or the like. Data that is the same as data 317 is also applied to delay element 311 and filtered by target filter 309. At this point, error estimator 307 calculates the error between data filtered by TEQ filter 305 and data filtered by target filter 309 and generates error information. The error information is communicated to update TEQ processor 313 and update target processor 315. Based on the error information, update TEQ processor 313 and update target processor 315 adapt TEQ filter 305 and target filter 309, respectively, in order to reduce the error, and more specifically, to reduce a function of that error.

Once the error is calculated, then it may be communicated to update TEQ processor 313 and update target processor 309 in order to adapt the output of channel 303 and TEQ filter 305 with target filter 309. One embodiment of the present invention uses an adaptive filter identification algorithm in order to reduce the error. This process is continued for any number of iterations in order to reduce the error. In this manner, channel 303 is effectively shortened, resulting in an equalized channel. In accordance with this embodiment of the present invention, convergence of the adaptive techniques allows the error to be decreased and approach (or equal to) zero. A function of the error may be calculated using one or more methodologies including a quadratic error, a cubic error, an absolute error, or any other function of the error, and the like. One or more adaptive filter identification algorithms may be used, including least mean square (LMS), recursive least square (RLS), or the like.

In order to better understand the filter adaptation process, the filter characteristics may be examined. In accordance with an embodiment of the present invention, one or more taps of TEQ filter 305 may be constrained during one or more iterations to any non-zero real number. Constraining a tap to a value keeps the tap value from changing. Alternatively, one or more taps of target filter 309 may be constrained during one or more iterations to any non-zero real number. By way of illustration, the central tap of TEQ filter 305 and/or target filter 309 may be constrained to any non-zero real number. Simulation examples have shown that constraining the central tap of TEQ filter 305 to a constant value avoids significant ripple in the band of interest and thus improves the spectral flatness of TEQ filter 305.

In accordance with this embodiment of the present invention, as update TEQ processor 313 and/or update target processor 315 change the values of one or more taps of TEQ filter 305 and/or target filter 309, respectively, the specified tap(s) of TEQ filter 305 and/or target filter 309 will remain constrained to the non-zero real number selected. In other words, the specified tap(s) of TEQ filter 305 and/or target filter 309 will not vary during operation. For each error calculated during each iteration, update TEQ processor 313 and update target processor 315 may change the non-constrained values of the taps of TEQ filter 305 and/or target filter 309, respectively.

Figure 4:
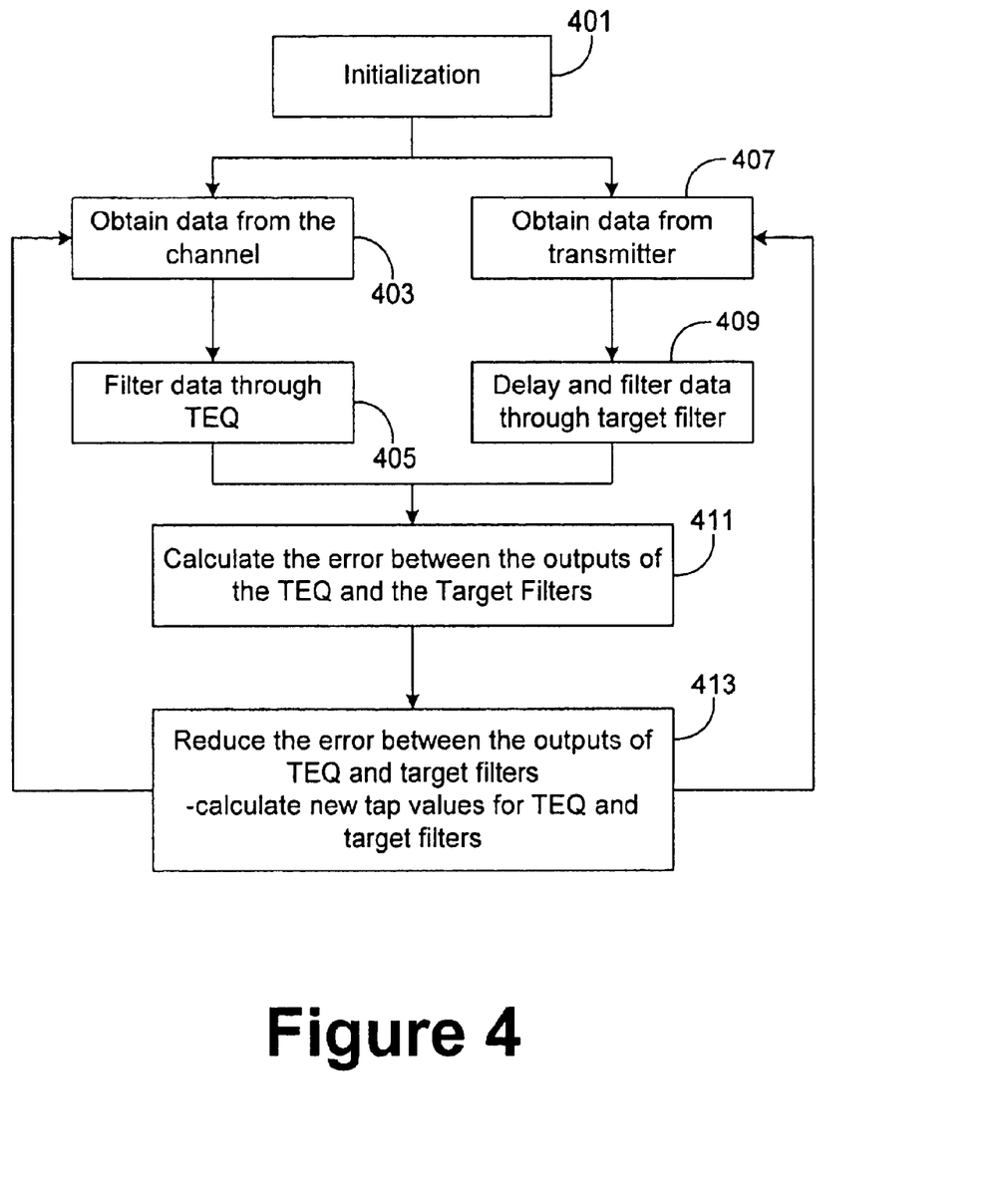
FIG. 4 is a flowchart illustrating a method according to one embodiment of the present invention.

In order to better illustrate the adaptation of TEQ filter 305 and target filter 309, FIG. 4 is a flowchart illustrating one method of the present invention of increasing the data rate of a communications system. In step 401, the system is initialized. Initialization includes zeroing (or otherwise setting) the tap values for TEQ filter 305 and target filter 309. Also during initialization, an appropriate delay for target filter 309 may be selected. Those skilled in the art will appreciate that an appropriate delay for delay element 311 may be chosen to achieve a shortened channel 303 in CP+1 number of taps. An appropriate delay may be computed by estimating the delay introduced by the channel by using, for example, the auto-correlation function between the input and the output signals of the channel. As discussed above, one or more specified taps (e.g., the central tap) of TEQ filter 305 and/or target filter 309 may be constrained to a non-zero real number during initialization, where constraining a tap value keeps the value from changing during iterations.

After initialization, data is obtained from channel 303 (step 403), and filtered by TEQ filter 305 (step 405). In step 407, the data is also delayed and filtered by target filter 309 in step 409. At this point, the difference between the TEQ filtered data and the target filtered data, i.e., the error, is calculated (step 411). Thus, the error (or a function of the error) between the output of TEQ filter 305 and the output of target filter 309 is calculated. During step 413, the error is communicated to update TEQ processor 313, which calculates new tap values for TEQ filter 305 (except for constrained taps). Accordingly, the error is also communicated to update target processor 315, which calculates new tap values for target filter 309. The new tap values calculated for target filter 309 may vary in value from the new tap values calculated for TEQ filter 305. Thus, in step 413, the error between the TEQ filtered data and the target filtered data is reduced by updating the taps of TEQ filter 305 and target filter 309 by iterative feedback of the error calculation to TEQ filter 305 and target filter 309. Such a feedback process continues reducing the error until the error reaches a predetermined tolerable level.

As discussed above, one way to reduce the error between the TEQ filtered data and the target filtered data is to calculate the new tap values for TEQ filter 305 and target filter 309 using an adaptive filter identification algorithm, such as LMS, RLS, or the like. Steps 403 through 413 are repeated in order to reduce the error between the TEQ filtered data and the target filtered data to a predetermined level. Accordingly, there may be a number of iterations before achieving a predetermined error. Optionally, once a predetermined error level is reached, adaptation of TEQ filter 305 and target filter 309 may stop. Alternatively, communications system 301 may continuously monitor TEQ filter 305 and target filter 309, even when the predetermined error level is reached. Thus, reducing and ideally optimizing the error between the TEQ filtered data and the target filtered data will adapt the convolution of channel 303 and TEQ filter 305 with target filter 309.

The TEQ filter design of the present invention reduces the error between the TEQ filter and the target filter by calculating one or more tap values for both while constraining one or more taps of the TEQ filter and/or the target filter. In addition, the TEQ filter design of the present invention balances the shortening of a channel with spectral flatness of the TEQ filter to increase the data rate of the communications system.

Although the invention has been described herein with reference to the appended drawing figures, it will be appreciated that the scope of the invention is not so limited. Various modifications in the design and implementation of various components and method steps discussed herein may be made without departing from the spirit and scope of the invention, as set forth in the appended claims.

What is claimed is:

1. An adaptive time domain equalizer filtering method for a communications system having a transmitter and a receiver that communicate via a channel, comprising the steps of:

initializing a time domain equalizer and a target filter;

transmitting data from the transmitter to the receiver via the channel;

obtaining the data from the channel and filtering a digital form of the data by the time domain equalizer;

filtering second data that is the same as the data transmitted from the transmitter with the target filter;

adapting the time domain equalizer and the target filter in order to shorten an impulse response of the channel; and predefined non-zero number to balance the shortening of the impulse response of the channel with a spectral flatness of the channel to increase a data rate of the communications system.

2. The method of claim 1, further comprising the steps of:

calculating an error between the output of the time domain equalizer and the output of the target filter;

calculating new taps for the time domain equalizer and the target filter based on the error calculated; and reducing a function of the error between the output of the time domain equalizer and the output of the target filter by updating the taps of the time domain equalizer and the target filter by feedback of the error calculation.

3. The method of claim 2, further comprising the step of calculating the new taps for the time domain equalizer and the target filter using an adaptive filter identification algorithm.

4. The method of claim 3, wherein the adaptive filter identification algorithm is at least one of a least mean square algorithm or a recursive least square algorithm.

5. An adaptive time domain equalizer filtering method for a communications system having a transmitter and a receiver that communicate via a channel, comprising the steps of:

initializing a time domain equalizer and a target filter, wherein the time domain equalizer is spectrally flat;

transmitting data from the transmitter to the receiver via the channel;

obtaining the data from the channel and filtering a digital form of the data by the time domain equalizer;

filtering second data that is the same as the data transmitted from the transmitter with the target filter;

adapting the time domain equalizer and the target filter in order to shorten the impulse response of the channel;

calculating an error between the output of the time domain equalizer and the output of the target filter;

calculating new taps for the time domain equalizer and the target filter based on the error calculated;

reducing a function of the error between the output of the time domain equalizer and the output of the target filter by updating the taps of the time domain equalizer and the target filter by feedback of the error calculation;

constraining at least one tap of the time domain equalizer to be a non-zero real number; and wherein constraining at least one tap is performed during initialization and includes constraining the central tap of the time domain equalizer.

6. The method of claim 2, further comprising the step of constraining at least one tap of the target filter to be a non-zero real number.

7. An adaptive time domain equalizer filtering method for a communications system having a transmitter and a receiver that communicate via a channel, comprising the steps of:

initializing a time domain equalizer and a target filter;

transmitting data from the transmitter to the receiver via the channel;

obtaining the data from the channel and filtering a digital form of the data by the time domain equalizer;

filtering second data that is the same as the data transmitted from the transmitter with the target filter;

adapting the time domain equalizer and the target filter in order to shorten an impulse response of the channel;

calculating an error between the output of the time domain equalizer and the output of the target filter;

calculating new taps for the time domain equalizer and the target filter based on the error calculated;

reducing a function of the error between the output of the time domain equalizer and the output of the target filter by updating the taps of the time domain equalizer and the target filter by feedback of the error calculation;

constraining at least one tap of the target filter to be a non-zero real number, wherein the constraining of the at least one tap is performed during initialization and includes constraining the central tap of the target filter; and constraining at least one tap of the time domain equalizer to be a predefined non-zero number to balance the shortening of the impulse response of the channel with a spectral flatness of the channel to increase a data rate of the communications system.

8. The method of claim 2, further comprising the step of constraining a plurality of taps of at least one of the time domain equalizer or the target filter to be non-zero real numbers.

9. The method of claim 1, further comprising the steps of:

delaying the second data before filtering the second data by the target filter;

calculating a function of the error between the output of the time domain equalizer and the output of the target filter;

calculating new taps for the time domain equalizer and the target filter based on the error calculated; and reducing a function of the error between the output of the time domain equalizer and the output of the target filter by updating the taps of the time domain equalizer and the target filter by feedback of the error calculation.

10. A communications system having a transmitter and a receiver that communicate via a channel, the receiver comprising:

a spectrally flat time domain equalizer filter configured to filter data outputted from the channel;

a target filter configured to filter second data that is the same as the data transmitted from the transmitter to the receiver; and an error estimator configured to calculate and reduce a function of the error between the filtered data from the time domain equalizer filter and the filtered second data from the target filter, wherein at least one tap of the spectrally flat time domain equalizer filter is constrained to be a predefined non-zero real number in order to balance a shortening of the impulse response of the channel with a spectral flatness of the channel to increase a data rate of the communications system.

11. A communications system having a transmitter and a receiver that communicate via a channel, the receiver comprising:

a spectrally flat time domain equalizer filter configured to filter data outputted from the channel;

a target filter configured to filter second data that is the same as an amount of data transmitted from the transmitter to the receiver;

an error estimator configured to calculate and reduce a function of the error between the filtered data from the time domain equalizer filter and the filtered second data from the target filter in order to shorten the impulse response of the and wherein the central tap of the time domain equalizer filter is constrained, and further comprising:

an update time domain equalizer processor configured to calculate new tap values for the time domain equalizer filter based on the error between the filtered data from the time domain equalizer filter and the filtered data from the target filter; and an update target processor configured to calculate new tap values for the target filter based on the error between the filtered data from the time domain equalizer filter and the filtered data from the target filter.

12. The communications system of claim 11, wherein:

the new tap values for the time domain equalizer filter are calculated using an adaptive filter identification algorithm; and the new tap values for the target filter are calculated using the adaptive filter identification algorithm.

13. The communications system of claim 10, wherein a plurality of taps of the time domain equalizer filter are constrained and the error estimator calculates the error between the filtered data from the time domain equalizer filter and the filtered second data from the target filter, and further comprising:

an update time domain equalizer processor that calculates new tap values for the time domain equalizer filter based on a function of the error, wherein the update time domain equalizer processor feeds back the new tap values for the time domain equalizer filter to the time domain equalizer filter in order to reduce the error between the filtered data from the time domain equalizer filter and the filtered second data from the target filter; and an update target processor that calculates new tap values for the target filter based on a function of the error, wherein the update target processor feeds back the new tap values for the target filter to the target filter in order to reduce the error between the filtered data from the time domain equalizer fitter and the filtered second data from the target filter.

14. A Digital Subscriber Line system having a transmitter and a receiver that communicate via a channel, the receiver comprising:
- an analog to digital converter coupled to a spectrally flat time domain equalizer filter, the spectrally flat time domain equalizer filter having at least one tap that is constrained to a predefined non-zero real number, thereby balancing a shortening of the impulse response of the channel with a spectral flatness of the channel to increase a data rate;
- an error estimator coupled to the spectrally flat time domain equalizer filter and coupled to a target filter, wherein the error estimator is configured to compare data filtered out of the spectrally flat time domain equalizer filter with data filtered out of the target filter and calculate an error;
- a fast Fourier transform engine coupled to the spectrally flat time domain equalizer filter; and
- a frequency domain equalizer coupled to the fast Fourier transform engine.

15. The Digital Subscriber Line system of claim 14,
- an update time domain equalizer processor configured to calculate new tap values for the spectrally flat time domain equalizer filter in order to reduce the error between the data filtered out of the spectrally flat time domain equalizer filter and the data filtered out of the target filter; and
- an update target processor configured to calculate new tap values for the target filter in order to reduce the error between the data filtered out of the spectrally flat time domain equalizer filter and the data filtered out of the target filter.

16. A Digital Subscriber Line system having a transmitter and a receiver that communicate via a channel, the receiver comprising:
- an analog to digital converter coupled to a spectrally flat time domain equalizer filter;
- an error estimator coupled to the spectrally flat time domain equalizer fitter and coupled to a target filter, wherein the error estimator is configured to compare data filtered out of the spectrally flat time domain equalizer filter with data filtered out of the target filter and calculate an error;
- a fast Fourier transform engine coupled to the spectrally flat time domain equalizer filter;
- a frequency domain equalizer coupled to the fast Fourier transform engine
- an update time domain equalizer processor configured to calculate new tap values for the spectrally flat time domain equalizer filter in order to reduce the error between the data filtered out of the spectrally flat time domain equalizer filter and the data filtered out of the target filter; and
- an update target processor configured to calculate new tap values for the target filter in order to reduce the error between the data filtered out of the spectrally flat time domain equalizer filter and the data filtered out of the target filter
- a delay element coupled to the target filter and the analog to digital converter for delaying the data before filtering the data by the target filter, wherein:
  - the central tap of the spectrally flat time domain equalizer filter is constrained to a non-zero real number;
  - the error estimator calculates an error between the output of the spectrally flat time domain equalizer filter and the output of the target filter;
  - the update time domain equalizer processor calculates new taps for the spectrally flat time domain equalizer filter based on the error in order to reduce the error between the spectrally flat time domain equalizer filter and the target filter;
  - the update target processor calculates the new taps for the target filter based on the error in order to reduce the error between the output of the spectrally flat time domain equalizer filter and the output of the target filter; and
  - the error between the output of the spectrally flat time domain equalizer filter and the output of the target filter is reduced by feedback of the error.

17. The Digital Subscriber Line system of claim 16, using an adaptive filter identification algorithm.

18. The Digital Subscriber Line system of claim 16, time domain equalizer filter are constrained.

* * * * *

UNITED STATES PATENT AND TRADEMARK OFFICE
CERTIFICATE OF CORRECTION

PATENT NO.    : 6,829,296 B1
DATED         : December 7, 2004
INVENTOR(S)   : Troulis et al.

It is certified that error appears in the above-identified patent and that said Letters Patent is hereby corrected as shown below:

Column 6,
Line 32, the words -- constraining at least one tap of the time domain equalizer to be a -- should be added before "predefined".

Column 8,
Line 28, add the words -- channel and increase the data rate; -- between "the" and "and".

Column 9,
Line 24, the words -- further comprising -- should be added after "14,".

Column 10,
Line 39, the words -- wherein the new tap values are calculated -- should be added between "16," and "using".
Line 41, the words -- wherein a plurality of taps of the spectrally flat -- should be added between "16," and "time".

Signed and Sealed this

Sixth Day of September, 2005

JON W. DUDAS
*Director of the United States Patent and Trademark Office*